US006312384B1

(12) United States Patent
Chiao

(10) Patent No.: US 6,312,384 B1
(45) Date of Patent: Nov. 6, 2001

(54) METHOD AND APPARATUS FOR FLOW IMAGING USING GOLAY CODES

(75) Inventor: Richard Yung Chiao, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/536,465

(22) Filed: Mar. 28, 2000

Related U.S. Application Data

(63) Continuation-in-part of application No. 09/299,034, filed on Apr. 23, 1999, now abandoned, which is a continuation-in-part of application No. 09/065,212, filed on Apr. 23, 1998, now Pat. No. 6,074,348, which is a continuation-in-part of application No. 09/052,789, filed on Mar. 31, 1998, now abandoned.

(51) Int. Cl.[7] ................................................... A61B 8/00

(52) U.S. Cl. ........................................... 600/443; 600/447

(58) Field of Search .................................... 600/437, 443, 600/447, 455, 458; 128/916; 73/625–627; 367/7, 11, 130

(56) References Cited

U.S. PATENT DOCUMENTS

| 4,276,885 | | 7/1981 | Tickner et al. ....................... 128/660 |
| 5,632,277 | | 5/1997 | Chapman et al. ............... 128/660.07 |
| 5,706,819 | | 1/1998 | Hwang et al. .................... 128/662.02 |
| 5,833,613 | | 11/1998 | Averkiou et al. ...................... 600/440 |
| 5,938,611 | * | 8/1999 | Muzilla et al. ........................ 600/455 |
| 5,961,463 | * | 10/1999 | Rhyne et al. .......................... 600/458 |
| 5,964,706 | * | 10/1999 | Mo et al. ............................... 600/443 |
| 5,980,459 | * | 11/1999 | Chiao et al. ........................... 600/447 |
| 5,984,869 | * | 11/1999 | Chiao et al. ........................... 600/437 |
| 6,030,344 | * | 2/2000 | Guracar et al. ....................... 600/440 |
| 6,042,545 | * | 3/2000 | Hossack et al. ...................... 600/443 |
| 6,210,332 | * | 4/2001 | Chiao et al. ........................... 600/443 |

OTHER PUBLICATIONS

Hein et al., "Current time–Domain Methods for Assessing Tissue Motion by Analysis from Reflected Ultrasound Echoes —A Review," IEEE Trans. Ultrason., Ferroelec., Freq. Contr., vol. 40, No. 2, Mar. 1993, pp. 84–102.

de Jong et al., "Characteristics of Contrast Agents and 2D Imaging," 1996 IEEE Ultrasonics Symposium, pp. 1449–1458.

Ishihara et al., "Path Lines in Blood Flow Using High Speed Digital Subtraction Echography," Proc. 1992 IEEE Ultrason. Symp., pp. 1277–1280.

Averkiou et al., "A New Imaging Technique Based on the Nonlinear Properties of Tissue," Proc. 1997 IEEE Ultrason. Symp.

Uhlendorf, "Physics of Ultrasound Contrast Imaging: etc.," IEEE Trans. Ultrason Ferroelec. & Freq. Control, vol. 41, No. 1, pp. 70–79, Jan. (1994).

(List continued on next page.)

*Primary Examiner*—Marvin M. Lateef
*Assistant Examiner*—Ali M. Imam
(74) *Attorney, Agent, or Firm*—Jill M. Breedlove; Christian G. Cabou

(57) ABSTRACT

Flow imaging of a living body using Golay codes and wall filtering is performed using Golay-encoded transmit sequences that are transmitted successively to a given focal position, with matched filtering being performed on the received echoes. The matched filtering may employ a constant scalar multiplier f (close to unity) that changes from one Golay pair to the next, but remains constant for each Golay pair. The output signals of the matched receive signal filtering for all of the firings are vector-summed to form a compressed and high-pass-filtered signal which is detected, log-compressed, and displayed in the conventional B-mode (i.e., as a gray-scale image). The high-pass filtering suppresses the strong tissue signal, thereby enabling visualization of the weaker blood signal with or without the tissue background.

33 Claims, 7 Drawing Sheets

OTHER PUBLICATIONS

Shahnazi et al., "Use of Contrast Agents in Ultrasound,"Proc. 1994 IEEE Ultrason. Symp., pp. 85–87.

Wang et al., "Contrast Medium Assisted Fluid Flow measurements," IEEE Trans. Ultrason. Ferroelec. & Freq. Control, vol. 42, No. 2, pp. 309–315, Mar. (1995).

* cited by examiner

METHOD AND APPARATUS FOR FLOW IMAGING USING GOLAY CODES

RELATED PATENT APPLICATIONS

This is a Continuation-in-Part of U.S. patent application Ser. No. 09/299,034 filed on Apr. 23, 1999, now abandoned which is a Continuation-in-Part of U.S. patent application Ser. No. 09/065,212 filed on Apr. 23, 1998, now U.S. Pat. No. 6,074,348 which in turn is a Continuation-in-Part of U.S. patent application Ser. No. 09/052,789 filed on Mar. 31, 1998 now abandoned.

FIELD OF THE INVENTION

This invention relates to ultrasound imaging systems, and more particularly, to methods and apparatus for imaging moving fluid and tissue.

BACKGROUND OF THE INVENTION

Conventional ultrasound scanners create two-dimensional B-mode images of tissue in which brightness of a pixel is based on intensity of the echo return. In a so-called "color flow" mode, the flow of blood or movement of tissue can be imaged. Conventional ultrasound flow imaging methods use either the Doppler principle or a time-domain cross-correlation method to estimate average flow velocity, which is then displayed in color overlaid on a B-mode image.

Measurement of blood flow in the heart and vessels using the Doppler effect is well known. The frequency shift of backscattered ultrasound waves may be used to measure velocity of tissue or blood. The change or shift in backscattered frequency increases when blood flows toward the transducer and decreases when blood flows away from the transducer. The Doppler shift may be processed to estimate the average flow velocity, which is displayed using different colors to represent speed and direction of flow. The color flow velocity mode displays hundreds of adjacent sample volumes simultaneously, all color-coded to represent velocity of each individual sample volume.

Conventional ultrasound flow imaging displays either average Doppler power ("power Doppler imaging") or average flow velocity ("color flow velocity imaging") as a color overlay on a B-mode image. The transmitted pulses are typically more narrow-band than B-mode pulses in order to gain Doppler sensitivity. Operating on a packet of as many as 16 transmits, a high-pass wall filter first rejects echoes from slower-moving tissue or vessel walls to reduce the signal dynamic range. The number of wall filter output samples per packet is given by (N−W+1), where N is the packet size and W is wall filter length. Subsequently, instantaneous Doppler power is computed as the magnitude squared of each wall filter quadrature output signal, and the average of all output signals yields the average Doppler power. Alternatively, the average velocity is computed from the wall filter quadrature output signal based on the Doppler principle (phase change) or time delay between firings. The Kasai autocorrelation algorithm or a time-domain cross-correlation algorithm can be used to estimate the average flow velocity.

Although conventional color-flow imaging has very good flow sensitivity, the ability to see physical flow is limited by its limited dynamic range (which is partially dependent on the compression curve), limited resolution (due to narrow-band pulses), limited frame rate (due to large packet sizes), and axial-only flow sensitivity (which is dictated by the reliance on the Doppler effect). In addition, conventional color-flow imaging suffers from artifacts such as aliasing, color blooming and bleeding.

In medical diagnostic ultrasound imaging, it is also desirable to optimize the signal-to-noise ratio (SNR). Increased SNR can be used to obtain increased penetration at a given imaging frequency or to improve resolution by facilitating ultrasonic imaging at a higher frequency. Coded excitation is a well-known radar technique used to increase signal-to-noise ratio in situations where the peak power of a transmitted signal cannot be increased but the average power can. This is often true in medical ultrasound imaging, where system design limitations dictate the peak amplitude of the signal driving the transducer. In this situation, longer signals, such as chirps, can be used to deliver higher average power values, and temporal resolution can be restored by correlating the return signal with a matched filter. Chirps, however, are expensive to implement on a phased array ultrasound system due to the complexity of the electronics, so binary codes, or codes that can be easily represented digitally as a series of digits equal to +1, −1 or 0, are much more practical. Binary codes are also preferred because they contain the most energy for a given peak amplitude and pulse duration.

A method for imaging moving blood reflectors using binary codes and displaying a combination of the flow image and the tissue image without overlay has been disclosed in the parent (Ser. No. 09/299,034) of the present application. One method of flow imaging disclosed uses single-transmit (e.g., Barker) codes. However, single-transmit codes have range lobes and require a long mismatched decoding filter. Consequently, single-transmit codes cannot be used on lower-frequency probes if the decoding filter length in the hardware is insufficient.

There is a need for a way of achieving flow imaging which will alleviate the limitations of the single-transmit codes and which can be employed with all types of probes.

SUMMARY OF THE INVENTION

Tissue and blood flow are imaged simultaneously, with improved sensitivity, by using Golay codes. Golay codes can achieve higher SNR gain and lower sidelobes than single-transmit (e.g., Barker) codes for a given transmit duration and receive-filter length. Since Golay codes use a pair of firings to achieve sidelobe cancellation, such codes were previously thought to be unsuitable for flow imaging. This is because the sidelobe cancellation property of Golay codes relies on the reflectors being invariant between the pair of firings. Thus, reflector motion between the two firings results in imperfect sidelobe cancellation and potentially high sidelobes.

In accordance with the preferred embodiments, multiple pairs of Golay codes are transmitted, and filtered on reception, to achieve SNR gain, sidelobe suppression, and equalization of tissue echoes such that the tissue and blood flow may be displayed together without overlay. By using matched filtering, a much shorter receive filter can be used than for mismatched filtering, as required for single-transmit (e.g., Barker) codes.

In a preferred embodiment, a pair of preferred Golay codes {A, B} is first selected, based on the autocorrelation sidelobes of the code. For a given code length, a large set of Golay code pairs may be generated. The preferred Golay pair is selected to minimize sidelobe energy and to maximize the concentration of the remaining sidelobe energy close to the mainlobe. Many different Golay pairs may have the same autocorrelation, so the preferred Golay pair is not unique.

The selected Golay code pair is then used to encode a base sequence into a pair of encoded transmit sequences {A*, B*}. The encoded transmit sequences are transmitted multiple times to a given focal position, with matched filtering performed on the received echoes. In accordance with a preferred embodiment, the matched filtering is performed with a constant scalar multiplier f (close to unity) that changes from one Golay pair to the next, but remains the same for each Golay pair. The output signals that result from the matched receive signal filtering for all of the firings are vector-summed to form a compressed and high-pass-filtered signal which is detected, log-compressed, and displayed in the conventional B-mode (i.e., as a gray-scale image). The high-pass filtering suppresses the strong tissue signal, thereby enabling visualization of the weaker blood signal with or without the tissue background.

DETAILED DESCRIPTION OF THE PREFERRED EMBODIMENTS

Figure 1:
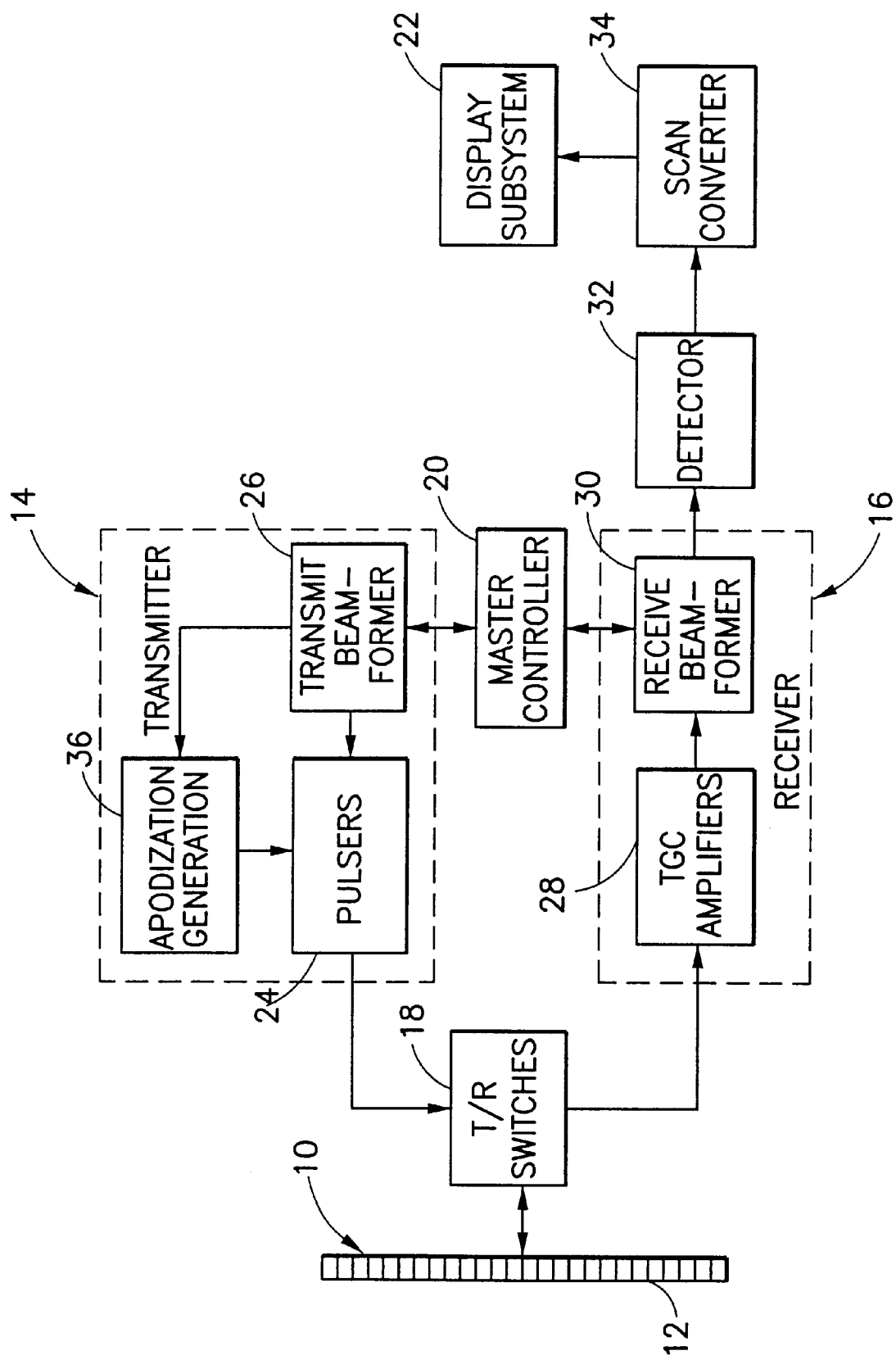
FIG. 1 is a block diagram depicting various subsystems of a conventional ultrasound imaging system.

A conventional ultrasonic imaging system, as depicted in FIG. 1, comprises a transducer array 10 consisting of a plurality of separately driven transducer elements 12, each of which produces a burst of ultrasonic energy when energized by a pulsed waveform produced by a transmitter 14. Ultrasonic energy reflected back to transducer array 10 from the object under study is converted to an analog electrical signal by each receiving transducer element 12 and applied separately to a receiver 16 through a set of transmit/receive (T/R) switches 18. Transmitter 14 and receiver 16 are operated under control of a host computer or master controller 20 responsive to commands provided by a human operator via an operator interface (not shown). A complete scan is performed by acquiring a series of echoes in which transmitter 14 is gated ON momentarily to energize each transducer element 12, and the subsequent echo signals produced by each transducer element 12 are applied to receiver 16. Receiver 16 converts the analog echo signals to digital signals and combines the respective digital signals derived from each transducer element to produce a single beamsummed signal that is used to produce a line in an image displayed by a display subsystem 22.

Under the direction of host computer 20, transmitter 14 drives transducer array 10 such that the ultrasonic energy is transmitted as a directed focused beam. To accomplish this, respective time delays are imparted to a multiplicity of pulsers 24 by a transmit beamformer 26. Host computer 20 determines the conditions under which the acoustic pulses will be transmitted. With this information, transmit beamformer 26 determines the timing and amplitudes of each of the transmit pulses to be generated by pulsers 24. The amplitudes of each transmit pulse are generated by an apodization generation circuit 36, such as a high-voltage controller which sets the power supply voltage to each pulser. Pulsers 24, in turn, send the transmit pulses to each of elements 12 of transducer array 10 via T/R switches 18, which protect time-gain compensation (TGC) amplifiers 28 from the high voltages which may exist at the transducer array. The apodization weightings are selected to achieve optimal compromise between transmit power and sidelobe level. Weightings also are generated by apodization generation circuit 36, as by a set of digital-to-analog converters that take the weighting data from transmit beamformer 26 and apply them to pulsers 24. By appropriately adjusting the transmit focus time delays in a conventional manner and also adjusting the transmit apodization weightings, a multiplicity of ultrasonic waves transmitted by individual transducer elements can be combined to form a directed and focused transmit beam. The apodization weightings and transmit focus time delays may be set by the host computer based on system programming and operator input.

Each burst of ultrasonic energy is reflected from objects located at successive ranges along each transmit beam. The resulting echo signals are sensed separately by each transducer element 12 and a sample of the magnitude of the echo signal at a particular point in time represents the amount of reflection occurring at a specific range. Due to differences in the propagation paths between a reflecting point and each transducer element 12, the echo signals are not detected simultaneously and their amplitudes are not equal. Receiver 16 amplifies the separate echo signals via a respective TGC amplifier 28 in each receive channel. Time-gain compensation is carried out by increasing or decreasing gain as a function of depth. The amount of amplification provided by the TGC amplifiers is controlled from a TGC circuit (not shown), that is set by the host computer and hand operation of potentiometers (not shown). The amplified echo signals are fed to receive beamformer 30.

Under the direction of host computer 20, receive beamformer 30 tracks the direction of the transmitted beam, imparts the proper time delays and receive apodization weightings to each amplified echo signal, and sums the echo signals to provide a summed echo signal that accurately represents the total ultrasonic energy reflected from a point located at a particular range in a particular transmit direction. The receive focus time delays are computed in real-time using specialized hardware, or are read from a lookup table. The receive channels also have circuitry for filtering the received pulses. The receive apodization weightings and receive focus time delays may be set by the host computer based on system programming and operator inputs.

The time-delayed receive signals are then summed and supplied to a signal processor or detector 32 that converts the summed receive signals to display data. In a typical gray-scale display image, the display data are the envelope of the signal with some additional processing, such as edge enhancement and logarithmic compression. For RF (radio frequency) data, the envelope can be detected using a low-pass filter; for baseband data, the envelope can be detected using an envelope detector which produces a signal representing $(I^2+Q^2)^{1/2}$, where I is the in-phase signal component and Q is the quadrature signal component of the baseband data.

A scan converter 34 receives the display data from detector 32 and converts the data into the desired image for display. In particular, scan converter 34 converts the acoustic image data from polar coordinate (R–θ) sector format or Cartesian coordinate linear array to appropriately scaled Cartesian coordinate display pixel data at the video rate. The scan-converted acoustic data are then provided for display by display subsystem 22, which images the time-varying amplitude of the envelope of the signal as a gray scale. A respective scan line is displayed for each transmit beam.

Figure 2:
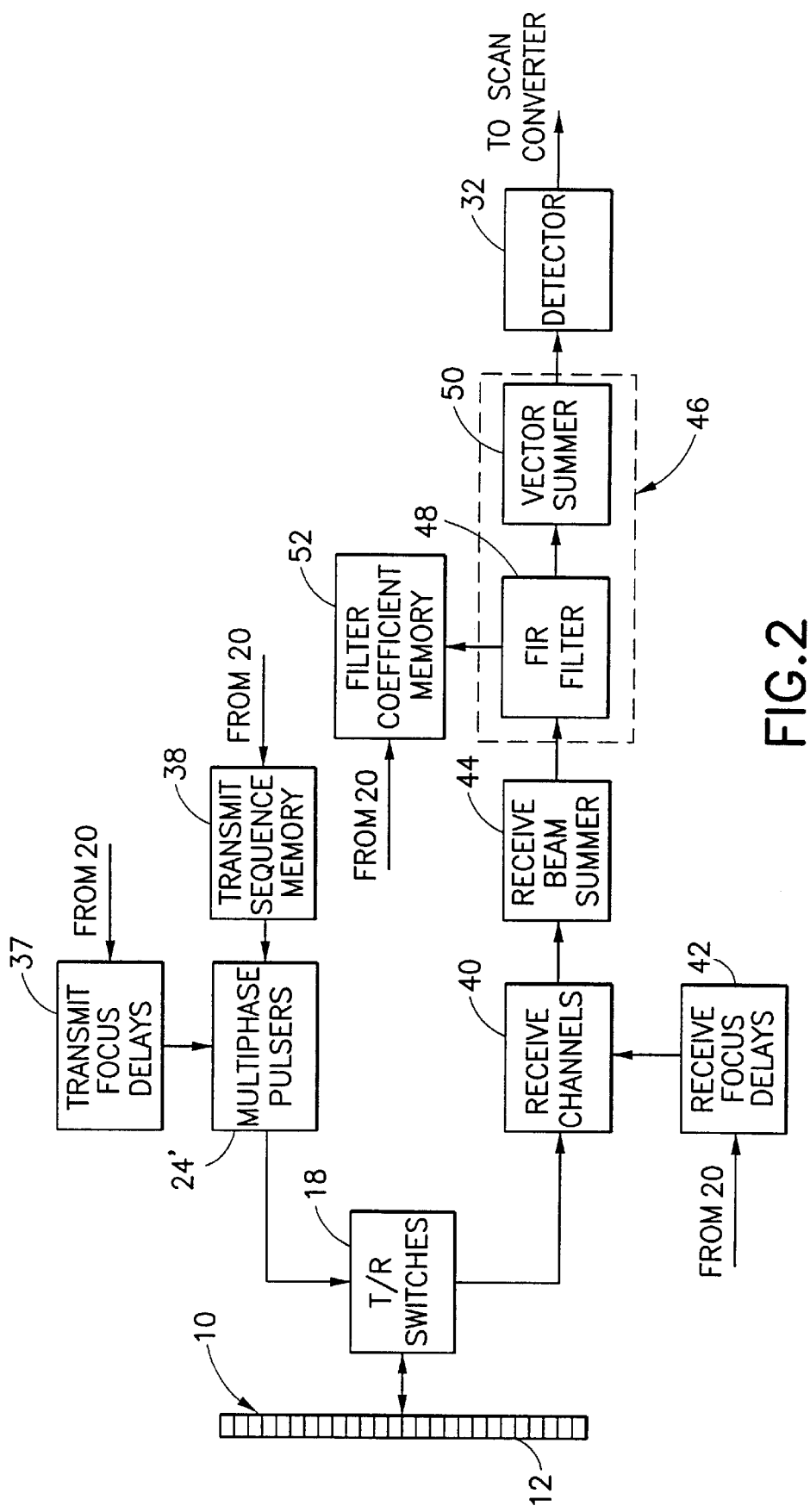
FIG. 2 is a block diagram of an ultrasound imaging system in accordance with one preferred embodiment of the invention.

FIG. 2 shows portions of an ultrasound imaging system that can be programmed with transmit sequences and receive filter coefficients in accordance with the preferred embodiments disclosed herein. Each transducer element in the transmit aperture is pulsed 2N times by a respective multiphase (e.g., bipolar) pulser 24' in accordance with a pair of Golay codes stored in transmit sequence memory 38. For example, the transducer elements are pulsed in accordance with a first Golay code during odd-numbered transmit firings and in accordance with a second Golay code during even-numbered transmit firings, wherein the first and second Golay codes are applied as phase coding (e.g., polarity reversal) to a conventional transmit pulse. Pulsers 24' drive elements 12 of transducer array 10 such that the ultrasonic energy produced is focused at a common transmit focal position for each transmit firing. To accomplish this, identical transmit focus time delays 37 are imparted to the respective pulsed waveforms produced by the pulsers. By appropriately adjusting the transmit focus time delays in a conventional manner, the ultrasonic beams can be focused at a multiplicity of transmit focal positions to effect a scan in an image plane.

For each transmit, the echo signals from transducer elements 12 are fed to respective receive channels 40 of the receive beamformer. Under the direction of host computer 20 (FIG. 1), the receive beamformer tracks the direction of the transmitted beam. The receive beamformer imparts the proper receive focus time delays 42 to the received echo signals and sums the received echo signals to provide a summed echo signal that accurately represents the total ultrasonic energy reflected from a particular transmit focal position along a transmit beam. The time-delayed receive signals are summed in a receive beam summer 44 for each of the 2N transmit firings focused at a particular transmit focal position. The summed receive signal for each of the 2N transmit firings is then provided in succession to a "slow-time" filter 46.

In accordance with the preferred embodiments of the invention, "slow-time" filter 46 comprises an FIR (finite impulse response) filter 48 having an input coupled to the output of receive beam summer 44, and a vector summer 50 having an input coupled to FIR filter 48 and an output coupled to detector 32. For a Golay code of length M, the FIR filter has M filter taps for receipt of a respective set of M filter coefficients for each transmit firing. The filter coefficients are provided by the host computer from filter coefficient memory 52 to filter 48 for each transmit firing. The filter coefficients are programmable, depending upon the diagnostic application. Different sets of filter coefficients can be stored in look-up tables inside the host computer memory, and the desired set of coefficients may be selectable by the system operator. For applications where the number of firings in the transmit pattern is 2N=4, four sets of filter coefficients are stored in memory. The 2N respective sets of filter coefficients from memory 52 are supplied to the taps of FIR filter 48 in succession, under control of the host computer, the input of each filter coefficient set being coordinated with arrival of the receive vector from the respective one of the 2N transmit firings. The successive FIR filter output signals for the 2N transmit firings are accumulated in vector summer 50 to form one wall filter output signal. Thus filter 46 filters across the 2N transmit firings and supplies the filtered signal to detector 32. Detector 32 forms the envelope of the firing-to-firing filtered signal. After post-processing (including edge enhancement and logarithmic compression) and scan conversion, a scan line is displayed on the monitor of display subsystem 22 (see FIG. 1). This procedure is repeated so that a respective scan line is displayed for each transmit focal position (when there is one transmit focal position for each beam angle) or for each vector (when there are multiple transmit focal positions for each beam angle).

The system transmits a predetermined pattern of Golay-encoded transmit sequences. The preferred Golay code pairs {A, B} are selected based on autocorrelation sidelobes of the code, as evidenced by the absolute value of the autocorrelation for that code. In particular, the preferred Golay pair is selected to minimize sidelobe energy and to maximize the concentration of the remaining sidelobe energy close to the mainlobe. A preferred Golay code pair of code length 4 is

A=[1, 1, 1, –1]

B=[1, 1, –1, 1].

Figure 3:
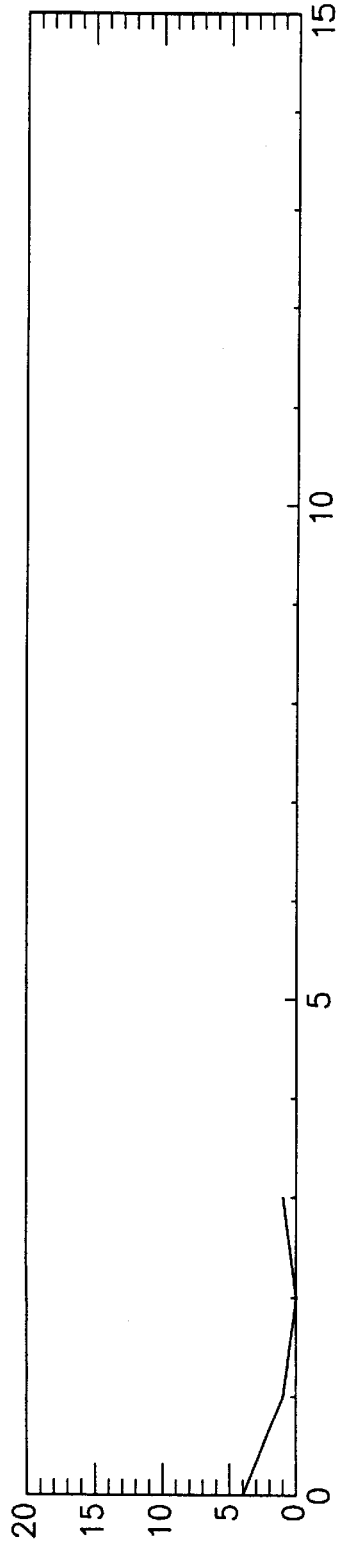
FIGS. 3–5 are graphs showing the absolute value of the autocorrelation for the following Golay codes: [1, 1, 1, −1] (FIG. 3); [1, 1, 1, 1, 1, −1, −1, 1] (FIG. 4); and [1, 1, −1, −1, 1, −1, −1, 1, −1, 1, −1, 1, −1, −1, −1, −1] (FIG. 5).

The absolute value of the autocorrelation for A=[1, 1, 1, –1] is shown in FIG. 3). A preferred Golay code pair of code length 8 is

A=[1, 1, 1, 1, 1, –1, –1, 1]

B=[1, –1, 1, –1, 1, 1, –1, –1].

Figure 4:
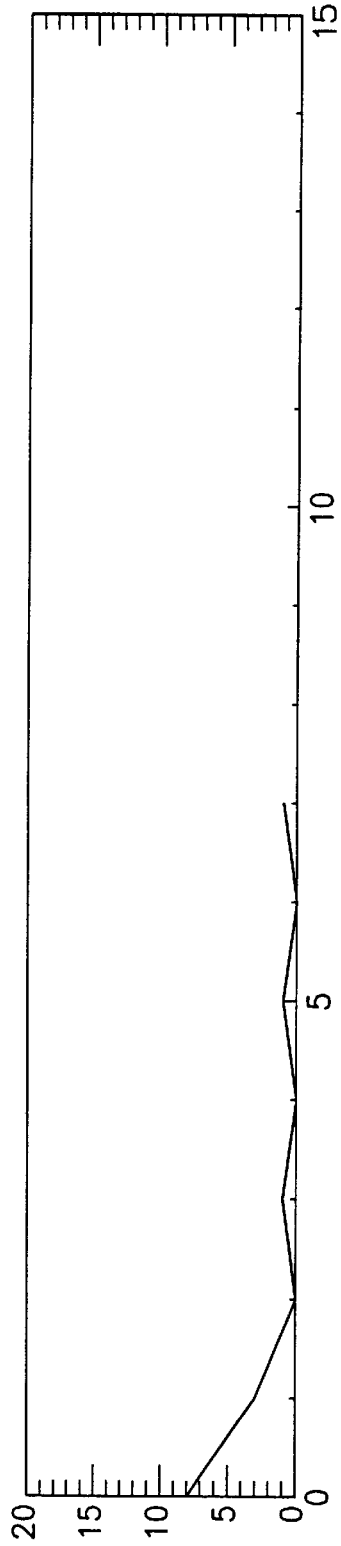

The absolute value of the autocorrelation for A=[p1, 1, 1, 1, 1, –1, –1, 1] is shown in FIG. 4. A preferred Golay code pair of code length 16 is

A=[1, 1, –1, –1, 1, –1, –1, 1, –1, 1, –1, 1, –1, –1, –1, –1]

B=[1, 1, –1, –1, –1, 1, 1, –1, –1, 1, –1, 1, 1, 1, 1, 1].

Figure 5:
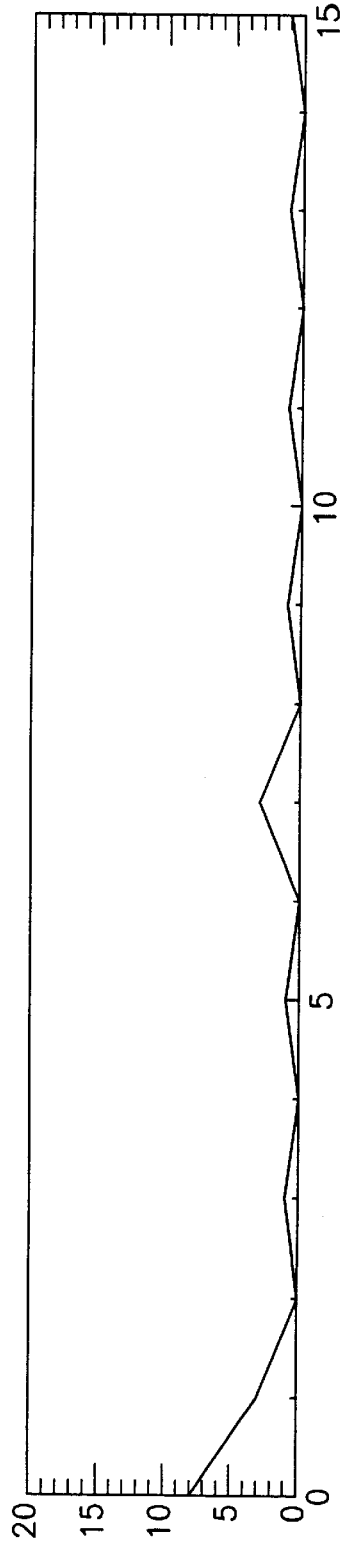
Figure 6:
FIGS. 6–10 are pulse diagrams showing a base sequence (FIG. 6), oversampled Golay sequences (FIGS. 7 and 9), and Golay-encoded transmit sequences (FIGS. 8 and 10) in accordance with the method for constructing transmit sequences.
Figure 7:
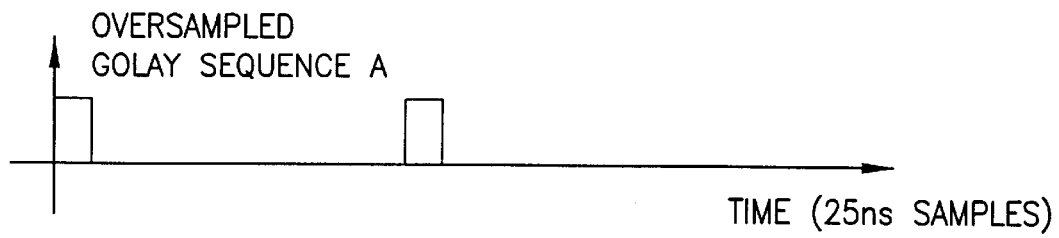

FIG. 5 shows the absolute value of the autocorrelation for A [1, 1, –1, –1, 1, –1, –1, 1, –1, 1, –1, 1, –1, –1, –1, –1].

Figure 8:
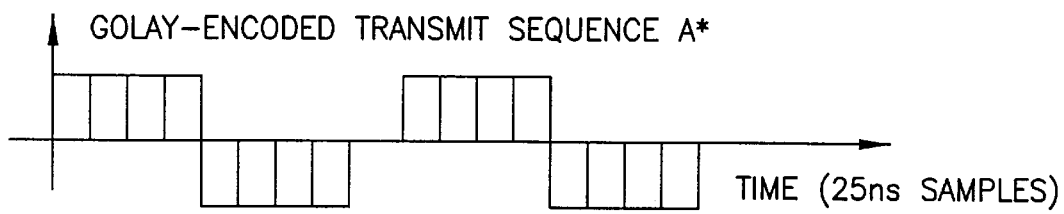
Figure 9:
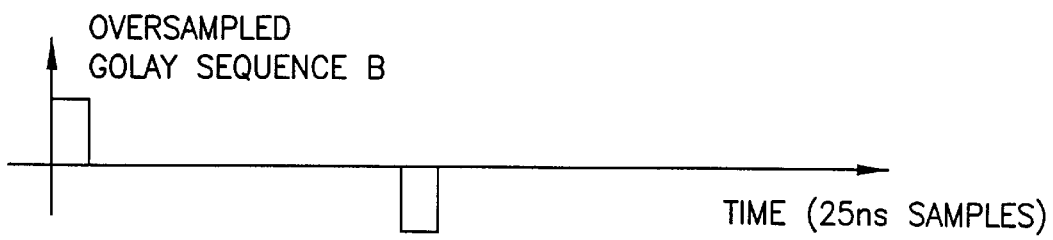
Figure 10:
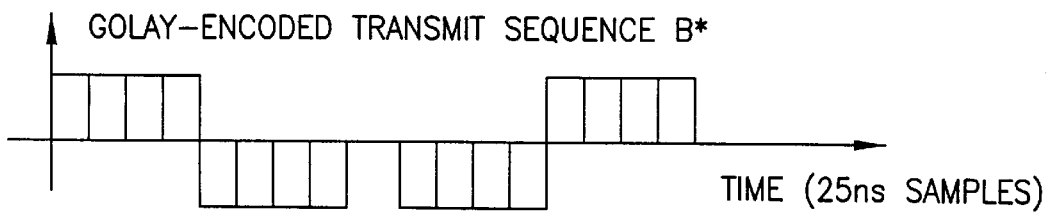

The selected Golay code pair is used to encode a base sequence into a pair of Golay-encoded transmit sequences {A*, B*}. FIGS. 6–10 illustrate the formation of the Golay-encoded transmit sequences from convolution of the base sequence with a respective one of a pair of oversampled Golay sequences. The base sequence is designed to optimize the resulting ultrasonic pulse shape and spectral energy to ensure that the most energy passes through the transducer passband. The appropriate base sequence can be selected depending on the operating characteristics of the transducer and the desired point spread function. In the example depicted in FIG. 6, the base sequence is a sequence of pulses having the polarities [1, 1, 1, 1, –1, –1, –1, –1]. For the first firing, the base sequence is convolved with oversampled Golay sequence A (see FIG. 7) corresponding to Golay code [1, 1]. The resulting Golay-encoded transmit sequence A* is shown in FIG. 8. For the second firing, the base sequence is convolved with oversampled Golay sequence B (see FIG. 9) corresponding to Golay code [1, –1]. The resulting Golay-encoded transmit sequence B* is shown in FIG. 10. The same technique can be applied to the preferred Golay codes disclosed above, having code length 4, 8, 16 or more. The Golay-encoded transmit sequences are precomputed and stored in the transmit memory. The transmit sequence, after exciting the transducer element, results in a sequence of ultrasonic pulses with polarity given by a Golay sequence for each firing.

A transmit pattern in accordance with one preferred embodiment of the invention is ABAB, where A and B form a Golay code pair as previously described. In this embodiment, the transmit codes are A, B, A and B for respective transmits, and the respective receive filter coefficients are A, B, −fA and −fB, where f is a scalar weighting or multiplier. The filter output signals for the four transmit firings may be respectively labeled as [S,M,S], [−S,M,−S], [−fS,−fM,−fS] and [fS,−fM,fS], where S denotes sidelobe, while M denotes mainlobe of the filter output signals, [S,M,S] is derived from the autocorrelation (A*A), [−S,M,−S] is derived from the autocorrelation (B*B), the filter output [−fS,−fM,−fS] is derived from the correlation (−fA*A), and [fS,−fM,fS] is derived from the autocorrelation (−fB*B). The auto-correlation of each Golay code within a Golay pair has sidelobes with opposite signs such that the sidelobes cancel out when the two autocorrelations are summed, which is the complementary (sidelobe cancellation) property of Golay codes. With motion between the multiple transmits, the sidelobe cancellation is inexact, which is the reason that the Golay code pairs were selected based on their single-code autocorrelation sidelobe properties. Having different slow-time filters between the mainlobe and sidelobes (as discussed below) further reduces residual sidelobes due to motion.

Figure 11:
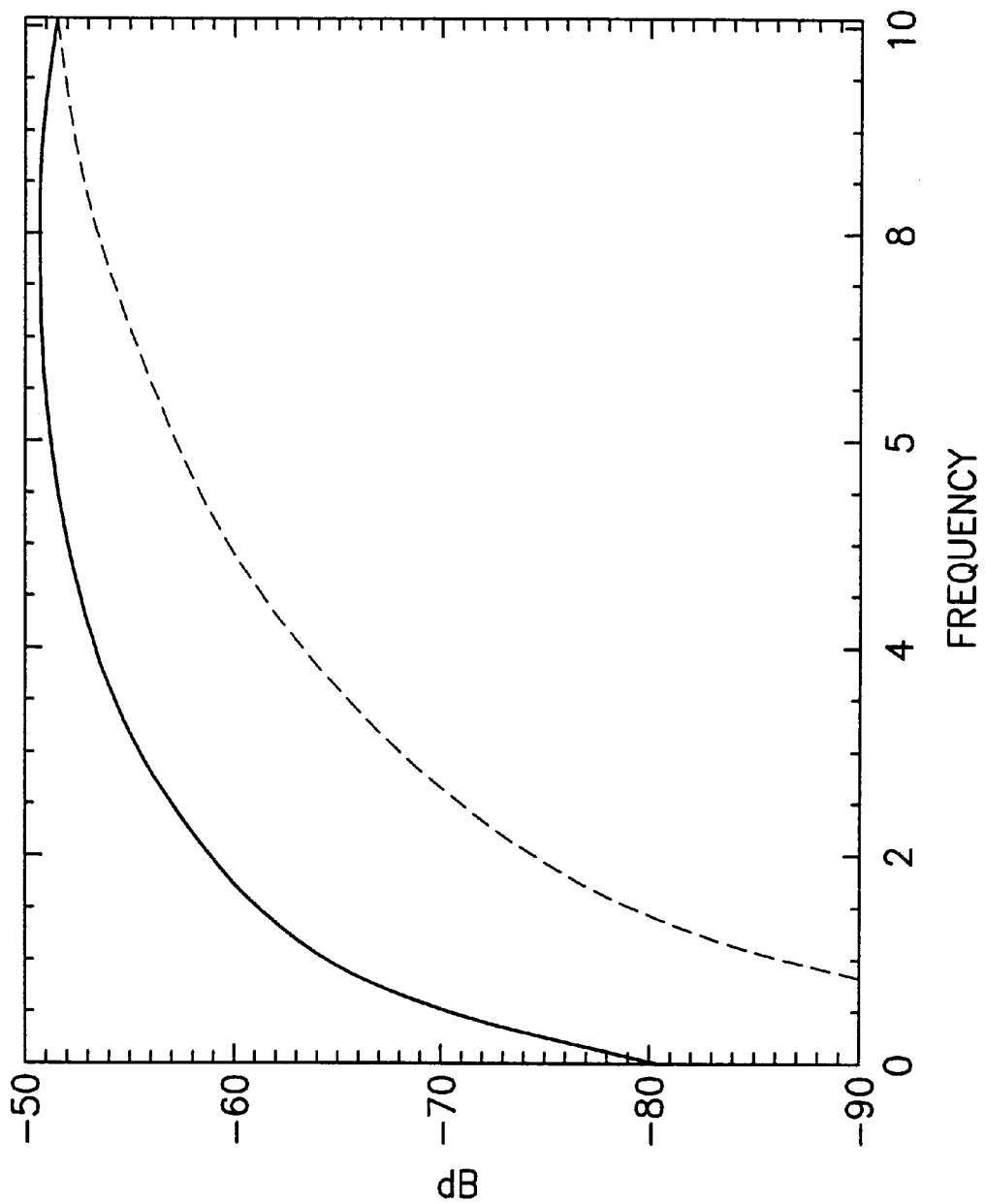
FIG. 11 is a graph of the slow-time filter responses for the mainlobe (solid line) and sidelobe (dashed line) when an ABAB Golay transmit code pattern and wall filter coefficients [1, 1, −0.95, −0.95] are used.
Figure 12:
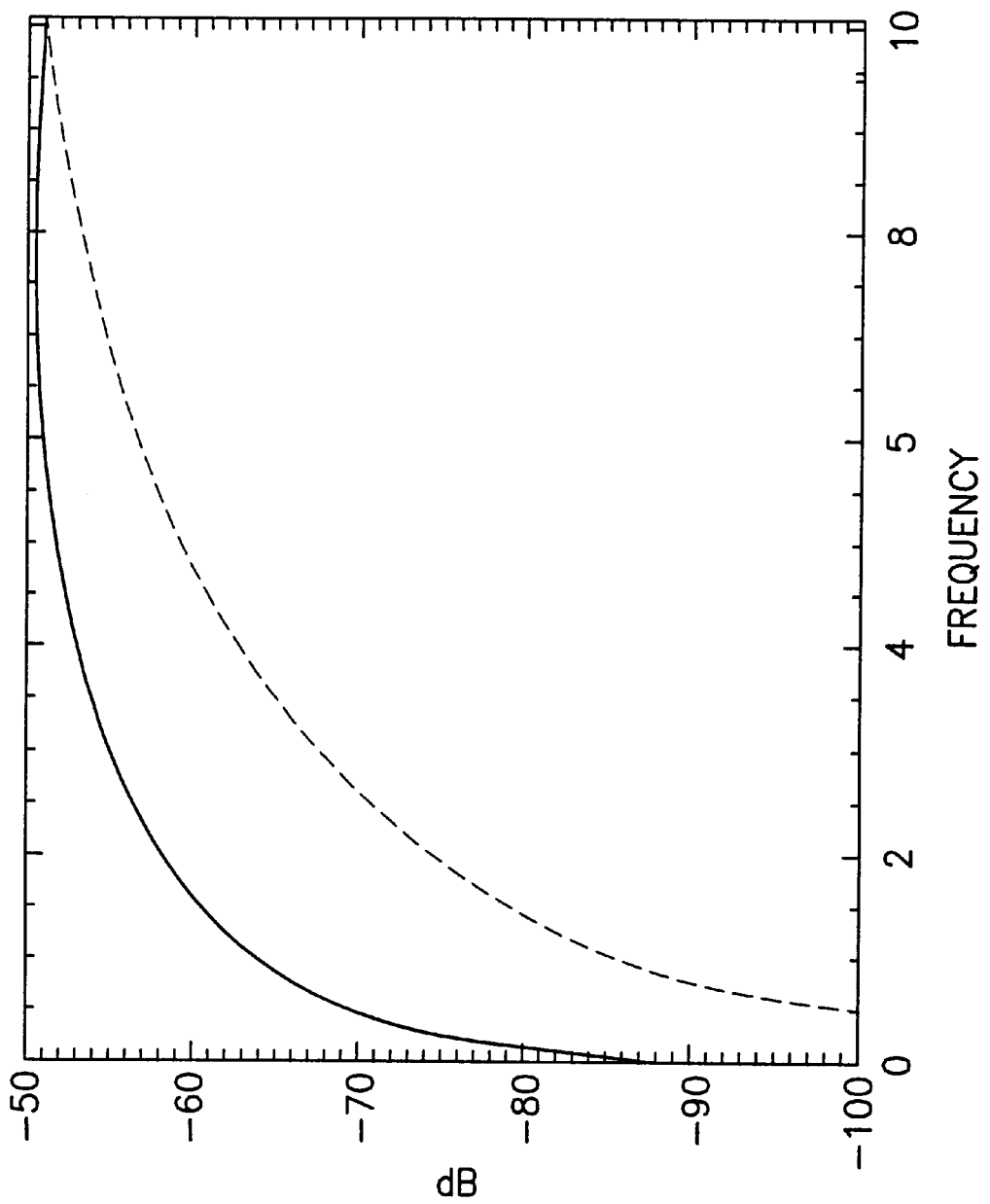
FIG. 12 is a graph of the slow-time filter responses for the mainlobe (solid line) and sidelobe (dashed line) when an ABAB Golay transmit code pattern and wall filter coefficients [1, 1, −1, −1] are used.
Figure 13:
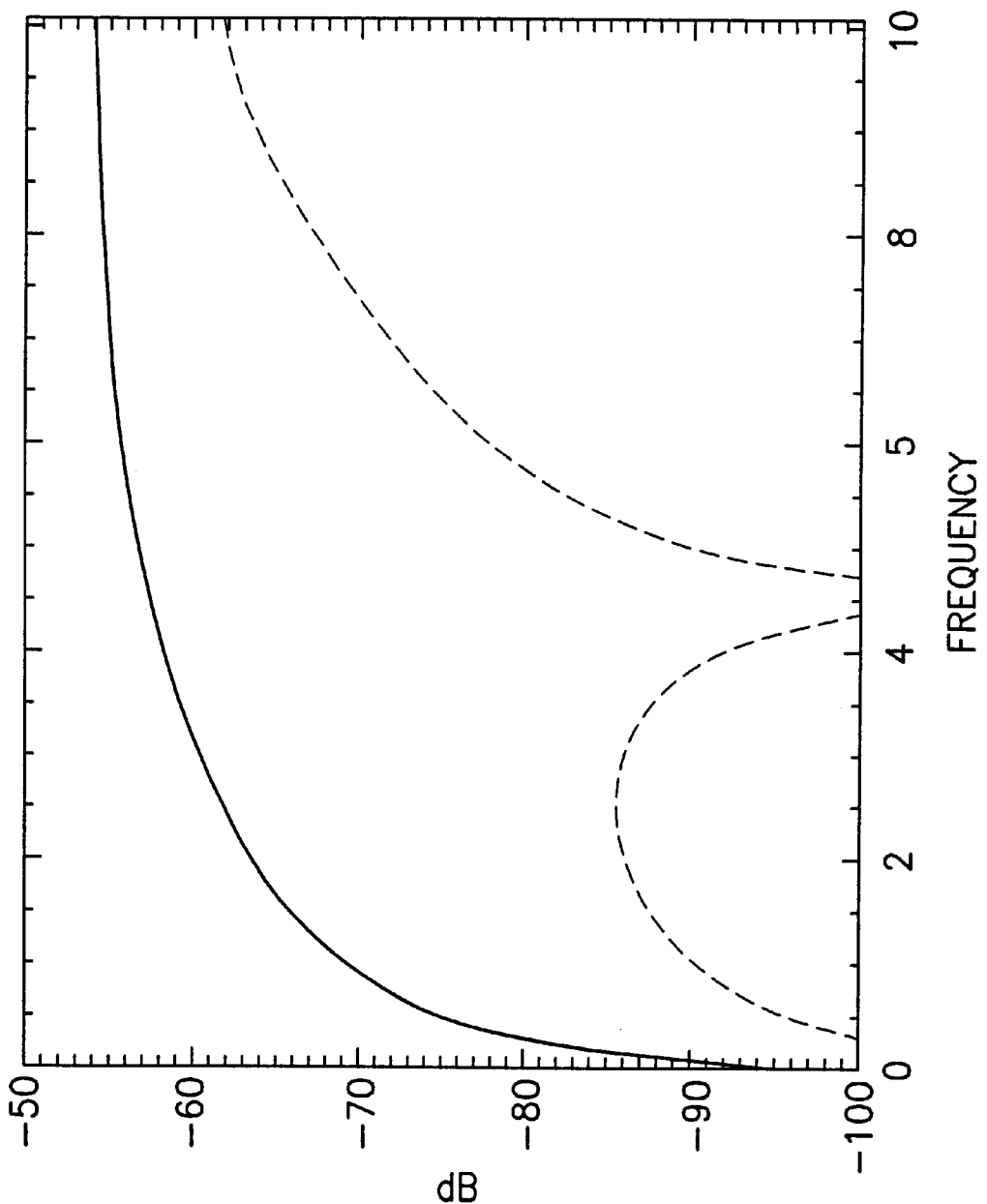
FIG. 13 is a graph of the slow-time filter responses for the mainlobe (solid line) and sidelobe (dashed line) when an ABBA Golay transmit code pattern and wall filter coefficients [0.4, 1, −1, −0.4] are used.

From the receive filter output signals [S,M,S], [−S,M,−S], [−fS,−fM,−fS] and [fS,−fM,−fS], it can be seen that the slow-time "wall" filters obtained when the four filtered receive signals are vector-summed are [1,1,−f,−f] for the mainlobe and [1,−1,−f,−f] for the sidelobe. FIG. 11 plots the slow-time filter responses for the mainlobe (solid line) and sidelobe (dashed line) when f=0.95, where zero frequency corresponds to stationary reflectors (usually tissue) and higher frequency corresponds to faster-moving reflectors (usually blood). As can be seen in FIG. 11, the sidelobes are fully suppressed for the tissue image and are reduced by about 15 dB for blood flow by the wall filter. (The region of interest generally falls below frequency index 4 in FIGS. 11–13.) If f is set to unity, there is full suppression of the stationary tissue image, which is useful for seeing more subtle flow. The corresponding filter responses for the mainlobe and sidelobe are shown in FIG. 12.

In accordance with an alternative preferred embodiment, increased sidelobe suppression may be achieved at the expense of decreased mainlobe gain by using an ABBA transmit pattern. In this preferred embodiment, the transmit codes are A, B, B and A for respective transmit firings, and the respective receive filter coefficients are fA, B, −B and −fA, where f is preferably equal to 0.4. The filter output signals for the four transmits may be respectively labeled as 0.4[S,M,S], [−S, M,−S], [S,M,S] and −0.4[S,M,S], where S and M again denote sidelobe and mainlobe, respectively. Of the filter output signals, 0.4[S,M,S] is derived from the autocorrelation (0.4A*A), [−S,M,−S] is derived from the auto-correlation (B*B), output [S,−M,S] is derived from the correlation (−B*B), and −0.4[S,M,S] is derived from the autocorrelation (−0.4A*A)

The corresponding filter responses for the mainlobe (solid line) and sidelobe (dashed line) are shown in FIG. 4. As can be seen, the sidelobe response curve for ABBA is lower than the sidelobe response curve corresponding to the ABAB transmit pattern. However, the ABBA pattern is not preferred because of the decreased mainlobe gain, lack of a corresponding scheme for combining flow and stationary tissue without rangelobes, and lack of practical need for increased sidelobe suppression in the ABAB scheme.

In accordance with the preferred embodiments of the invention, the flow image may be displayed by itself for maximum flow contrast, or may be summed with a B-mode background image. Superimposition of the flow image on a conventional B-mode image allows the diagnostician to observe the blood flow relative to known anatomical landmarks during medical diagnosis. The flash artifact seen in this summation of flow and B-mode images is more benign than that found in conventional color-flow imaging.

Using the ABAB transmit pattern, a B-mode image derived from the fundamental frequency band is summed with the flow image. This is achieved by perturbing one of the "slow-time" filter weightings so that a fundamental B-mode signal component is passed or fed through the wall filter. In the example given above, the scalar weighting f was set equal to 0.95 for one pair of Golay-encoded transmit sequences. The B-mode feedthrough allows the flow image to be superimposed on top of a conventional B-mode image for display. Alternatively, the flow image may be superimposed in color on a conventional B-mode image for display. This feedthrough technique is one way of obtaining the B-mode background image without additional firings. Other ways of obtaining a B-mode background image include transmitting pulses specifically for the B-mode image (this method is required for an ROI) and transmitting pulses that are slightly different from each other within a packet such that the wall filter output signal is not zero even with everything stationary.

In the embodiments based on FIG. 2, the decoding filter, bandpass filter and wall filter are combined in an FIR filter dynamically supplied with appropriate filter coefficients and a vector summer. However, those skilled in the art will recognize that separate filters could be used. For example, the decoding filter and bandpass filter can be combined in an FIR filter while the wall filter is separate.

In accordance with another preferred embodiment of the invention, contrast agents such as gas-filled microbubbles are injected into the blood to serve as markers for imaging blood flow. As in the previously described embodiment, a pattern of Golay-encoded transmit sequences is transmitted to a particular transmit focal position. Echo signals are generated from interaction between the transmitted ultrasound pulses and the propagation medium, especially the injected contrast agents. On receive, the receive signals are decoded, bandpass filtered and wall filtered to provide a signal having reduced sidelobes. As a result of this filtering, fundamental signals reflected from non-stationary tissue or flow regions along the transmit path can be extracted. The resulting flow signals are superimposed on, or summed with, a conventional B-mode imaging data vector, and displayed. Received energy at the fundamental frequency, which would have contributed to undesirable stationary tissue signal, is suppressed by the wall filter.

In a preferred embodiment, the scan direction of the ultrasound beam is opposite that of the blood flow direction, thereby providing greater apparent flow sensitivity (more uniform fill-out to vessel edge) and greater resolution (smaller scatterer sizes). The scan direction is changed by user control, either electronically, or by manually turning the probe around.

While only certain preferred features of the invention have been illustrated and described, many modifications and changes will occur to those skilled in the art. For example, in the ABAB transmit pattern, the weighting factor f can be applied to the third and fourth transmits or to the first and second transmits. Further, a BAAB transmit pattern can be used in place of the ABBA transmit pattern. Instead of negating the receive filter coefficients for the third and fourth transmits and then vector summing the receive-filtered signals for the first through fourth transmits, a vector subtractor can be used to perform subtraction on the respective sets of receive filter output signals. It is, therefore, to be understood that the appended claims are intended to cover all such modifications and changes as fall within the true spirit of the invention

What is claimed is:

1. An imaging system comprising:
   a transducer array comprising a multiplicity of transducer elements for transmitting wave energy in response to electrical activation and transducing returned wave energy into electrical signals;
   a transmitter coupled to said transducer array and programmed to activate a plurality of said transducer elements to transmit focused wave energy in four sequential transmits, said wave energy being encoded with a first Golay code of a Golay code pair during first and third transmits and being encoded with a second Golay code of said Golay code pair during second and fourth transmits;
   a receiver programmed to respectively form first through fourth receive signals from electrical signals supplied from said plurality of transducer elements subsequent to said first through fourth transmits respectively;
   a filter for:
   (a) filtering said first and second receive signals as a function of said first and second Golay codes respectively to form first and second filtered signals respectively,
   (b) filtering said third and fourth receive signals as a function of said first and second Golay codes respectively to form third and fourth filtered signals respectively, and
   (c) inverting one of first and second sets of filtered signals, said first set comprising said first and second filtered signals and said second set comprising said third and fourth filtered signals;
   a vector summer for summing said first through fourth filtered signals to form a flow signal; and
   a subsystem for displaying an image having an image portion which is a function of said flow signal.

2. The system as recited in claim 1, wherein said transmitter is programmed to activate said plurality of transducer elements to transmit first through fourth transmit beams of wave energy during said first through fourth transmits respectively, said first through fourth transmits being focused at a substantially common focal position relative to said transducer array.

3. The system as recited in claim 1, wherein said Golay code pair is selected to minimize autocorrelation sidelobe energy and to maximize concentration of remaining sidelobe energy close to the mainlobe.

4. The system as recited in claim 3, wherein said Golay code pair is [1, 1, 1, -1], [1, 1, -1, 1].

5. The system as recited in claim 3, wherein said Golay code pair is [1, 1, 1, 1, 1, -1, -1, 1], [1, -1, 1, -1, 1, 1, -1, -1].

6. The system as recited in claim 3, wherein said Golay code pair is
[1, 1, -1, -1, 1, -1, -1, 1, -1, 1, -1, 1, -1, -1, -1, -1]
[1, 1, -1, -1, -1, 1, 1, -1, -1, 1, -1, 1, 1, 1, 1, 1].

7. The system as recited in claim 1, wherein said filter is programmed with first through fourth sets of filter coefficients for filtering said first through fourth receive signals respectively, the filter coefficients of said first set being of magnitudes that are respectively proportional to the filter coefficients of said third set by a predetermined factor.

8. The system as recited in claim 7, wherein said predetermined factor is unity.

9. The system as recited in claim 7, wherein said predetermined factor is less than unity.

10. The system as recited in claim 7, wherein the filter coefficients of said second set are of magnitudes respectively proportional to the filter coefficients of said fourth set by said predetermined factor.

11. The system as recited in claim 1, wherein said subsystem comprises:
    a processing subsystem for forming a flow image signal from said flow signal; and
    a display subsystem programmed to display said image portion as a function of said flow image signal.

12. An imaging system comprising:
    a transducer array comprising a multiplicity of transducer elements for transmitting wave energy in response to electrical activation and traducing returned wave energy into electrical signals;
    a transmitter coupled to said transducer array and programmed to activate a plurality of said transducer elements to transmit focused wave energy in four sequential transmits, said wave energy being encoded with a first Golay code of a Golay code pair during first and third transmits and being encoded with a second Golay code of said Golay code pair during second and fourth transmits;
    a receiver programmed to respectively form first through fourth receive signals from electrical signals supplied from said plurality of transducer elements subsequent to said first through fourth transmits respectively;
    a filter for filtering said first and second receive signals as a function of said first and second Golay codes respectively to form first and second filtered signals respectively, and for filtering said third and fourth receive signals as a function of said first and second Golay codes respectively to form third and fourth filtered signals respectively;
    a vector subtractor for subtracting a first set of filtered signals from a second set of filtered signals to form a flow signal, said first set comprising said first and second filtered signals and said second set comprising said third and fourth filtered signals; a vector summer for combining output signals produced by said vector subtractor; and
    a subsystem for displaying an image having an image portion which is a function of said flow signal.

13. The system as recited in claim 12, wherein said Golay code pair is selected to minimize autocorrelation sidelobe energy and to maximize concentration of remaining sidelobe energy close to the mainlobe.

14. An imaging system comprising:
    a transducer array comprising a multiplicity of transducer elements for transmitting wave energy in response to electrical activation and transducing returned wave energy into electrical signals;
    a transmitter coupled to said transducer array and programmed to activate a plurality of said transducer elements to transmit focused wave energy in four sequential transmits, said wave energy being encoded with a first Golay code of a Golay code pair during first and third transmits and being encoded with a second Golay code of said Golay code pair during second and fourth transmits;

a receiver programmed to respectively form first through fourth receive signals from electrical signals supplied from said plurality of transducer elements subsequent to said first through fourth transmits respectively;

means for
(a) filtering said first and second receive signals as a function of said first and second Golay codes respectively to form first and second filtered signals respectively,
(b) filtering said third and fourth receive signals as a function of said first and second Golay codes respectively to form third and fourth filtered signals respectively, and
(c) inverting one of first and second sets of filtered signals, said first set comprising said first and second filtered signals and said second set comprising said third and fourth filtered signals;

means for vector summing said first through fourth filtered signals to form a flow signal; and a subsystem for displaying an image having an image portion which is a function of said flow signal.

15. An imaging system comprising;
a transducer array comprising a multiplicity of transducer elements for transmitting wave energy in response to electrical activation and transducing returned wave energy into electrical signals;
a transmitter coupled to said transducer array and programmed to activate a plurality of said transducer elements to transmit focused wave energy in four sequential transmits, said wave energy being encoded with a first Golay code of a Golay code pair during first and third transmits and being encoded with a second Golay code of said Golay code pair during second and fourth transmits;
a receiver programmed to respectively form first through fourth receive signals from electrical signals supplied from said plurality of transducer elements subsequent to said first through fourth transmits respectively;
a wall filter for decoding said first and third receive signals as a function of said first Golay code to form first and third decoded signals respectively, decoding said second and fourth receive signals as a function of said second Golay code to form second and fourth decoded signals respectively, and wall-filtering said first through fourth decoded signals to form a flow signal; and
a subsystem for displaying an image having an image portion which is a function of said flow signal.

16. The system as recited in claim 15, wherein said wall filter comprises an FIR (finite impulse response) filter and a vector summer connected to sum output signals from said FIR filter.

17. An imaging system comprising:
a transducer array comprising a multiplicity of transducer elements for transmitting wave energy in response to electrical activation and transducing returned wave energy into electrical signals;
a display monitor for displaying an image having an image portion which is a function of a flow image signal; and a processor programmed to perform the following steps:
(a) activating transducer elements of said array to transmit focused wave energy in four sequential transmits, said wave energy being encoded with a first Golay code of a Golay code pair during first and third transmits and being encoded with a second Golay code of said Golay code pair during second and fourth transmits;
(b) forming first through fourth receive signals from electrical signals supplied from said plurality of transducer elements subsequent to said first through fourth transmits respectively;
(c) filtering said first and third receive signals as a function of said first Golay code to form first and third filtered signals respectively;
(d) filtering said second and fourth receive signals as a function of said second Golay code to form second and fourth filtered signals respectively;
(e) wall-filtering said first through fourth filtered signals to form a flow signal;
(f) forming a flow image signal derived at least in part from said flow signal; and
(g) applying said flow image signal to said display monitor.

18. The system as recited in claim 17, wherein said processor comprises an FIR (finite impulse response) filter for performing said filtering and a vector summer connected to sum output signals from said FIR filter.

19. The system as recited in claim 17, wherein said Golay code pair is selected to minimize sidelobe energy and maximize concentration of remaining sidelobe energy close to the mainlobe.

20. An imaging method comprising the steps of:
transmitting focused wave energy in four sequential transmits, said wave energy being encoded with a first Golay code of a Golay code pair during first and third transmits and with a second Golay code of said Golay code pair during second and fourth transmits;
forming first through fourth receive signals derived from echo signals detected subsequent to said first through fourth transmits respectively;
filtering said first and third receive signals as a function of said first Golay code to form first and third filtered signals respectively;
filtering said second and fourth receive signals as a function of said second Golay code to form second and fourth filtered signals respectively;
wall-filtering said first through fourth filtered signals to form a flow signal; and
displaying an image having an image portion which is a function of said flow signal.

21. The imaging method as recited in claim 20, wherein said Golay code pair is selected to minimize sidelobe energy and maximize concentration of remaining sidelobe energy close to the mainlobe.

22. The imaging method as recited in claim 20, including the step of employing first through fourth sets of filter coefficients for filtering said first through fourth receive signals respectively, wherein the filter coefficients of said first set have magnitudes respectively proportional to the filter coefficients of said third set by a predetermined factor.

23. The imaging method as recited in claim 22, wherein said predetermined factor is unity.

24. The imaging method as recited in claim 22, wherein said predetermined factor is less than unity.

25. The imaging method as recited in claim 22, wherein the filter coefficients of said second set have magnitudes respectively proportional to the filter coefficients of said fourth set by said predetermined factor.

26. An imaging system comprising:

a transducer array comprising a multiplicity of transducer elements for transmitting wave energy in response to electrical activation and transducing returned wave energy into electrical signals;

a transmitter coupled to said transducer array and programmed to activate a plurality of said transducer elements to transmit focused wave energy in four sequential transmits, said wave energy being encoded with a first Golay code of a Golay code pair during first and fourth transmits and being encoded with a second Golay code of said Golay code pair during second and third transmits;

a receiver programmed to respectively form first through fourth receive signals from electrical signals supplied from said plurality of transducer elements subsequent to said first through fourth transmits respectively;

a wall filter for decoding said first and fourth receive signals as a function of said first Golay code to form first and fourth decoded signals respectively, decoding said second and third receive signals as a function of said second Golay code to form second and third decoded signals respectively, and wall-filtering said first through fourth decoded signals to form a flow signal; and a subsystem for displaying an image having an image portion which is a function of said flow signal.

27. The system as recited in claim 26, wherein said wall filter comprises an FIR (finite impulse response) filter and a vector summer connected to sum output signals from said FIR filter.

28. The system as recited in claim 27, wherein said FIR filter is programmed with first through fourth sets of filter coefficients for filtering said first through fourth receive signals respectively, wherein the filter coefficients of said first and fourth sets have magnitudes respectively proportional to the filter coefficients of said second and third sets by a predetermined factor.

29. The system as recited in claim 28, wherein said predetermined factor is approximately equal to 0.4.

30. The system as recited in claim 26, wherein said Golay code pair is selected to minimize sidelobe energy and maximize concentration of remaining sidelobe energy close to the mainlobe.

31. An imaging system comprising:

a transducer array comprising a multiplicity of transducer elements for transmitting wave energy in response to electrical activation and transducing returned wave energy into electrical signals;

a display monitor for displaying an image having an image portion which is a function of a flow image signal; and a processor programmed to perform the following steps:
(a) activating transducer elements of said array to transmit focused wave energy in four sequential transmits, said wave energy being encoded with a first Golay code of a Golay code pair during first and fourth transmits and being encoded with a second Golay code of said Golay code pair during second and third transmits;
(b) forming first through fourth receive signals from electrical signals supplied from said plurality of transducer elements subsequent to said first through fourth transmits respectively;
(c) filtering said first and fourth receive signals as a function of said first Golay code and a predetermined factor to form first and fourth filtered signals respectively;
(d) filtering said second and third receive signals as a function of said second Golay code to form second and third filtered signals respectively;
(e) wall-filtering said first through fourth filtered signals to form a flow signal;
(f) forming a flow image signal derived at least in part from said flow signal; and
(g) applying said flow image signal to said display monitor.

32. The system as recited in claim 31, wherein said predetermined factor is approximately equal to 0.4.

33. An imaging method comprising the steps of:

transmitting focused wave energy in four sequential transmits, said wave energy being encoded with a first Golay code of a Golay code pair during first and fourth transmits and with a second Golay code of said Golay code pair during second and third transmits;

forming first through fourth receive signals derived from echo signals detected subsequent to said first through fourth transmits respectively;

filtering said first and fourth receive signals as a function of said first Golay code and a predetermined factor to form first and fourth filtered signals respectively;

filtering said second and third receive signals as a function of said second Golay code to form second and third filtered signals respectively;

wall-filtering said first through fourth filtered signals to form a flow signal; and displaying an image having an image portion which is a function of a flow image signal.

* * * * *